United States Patent
Peeters et al.

(10) Patent No.: US 11,921,379 B2
(45) Date of Patent: Mar. 5, 2024

(54) PROCESS FOR DRIVING A 2D/3D SWITCHABLE AUTOSTEREOSCOPIC DISPLAY DEVICE

(71) Applicant: ZHANGJIAGANG KANGDE XIN OPTRONICS MATERIAL CO. LTD, Zhangjiagang (CN)

(72) Inventors: Patrick Godefridus Jacobus Maria Peeters, Veldhoven (NL); Hubertus Petrus Cornelis Vankuringen, Veldhoven (NL); Ivar Jacco Boerefijn, Veldhoven (NL); Andrii Ivanovych Rudavskyi, Veldhoven (NL); Pieter Wilhelmus Theodorus De Jong, Veldhoven (NL)

(73) Assignee: ZHANGJIAGANG KANGDE XIN OPTRONICS MATERIAL CO., LTD., Zhangjiagang (CN)

( * ) Notice: Subject to any disclaimer, the term of this patent is extended or adjusted under 35 U.S.C. 154(b) by 267 days.

(21) Appl. No.: 17/418,273

(22) PCT Filed: Dec. 27, 2019

(86) PCT No.: PCT/CN2019/129252
§ 371 (c)(1),
(2) Date: Jun. 25, 2021

(87) PCT Pub. No.: WO2020/135731
PCT Pub. Date: Jul. 2, 2020

(65) Prior Publication Data
US 2022/0146890 A1    May 12, 2022

(30) Foreign Application Priority Data
Dec. 29, 2018 (NL) ..................... 2022327

(51) Int. Cl.
*G02F 1/1337* (2006.01)
*G02B 30/28* (2020.01)
(Continued)

(52) U.S. Cl.
CPC ....... *G02F 1/133769* (2021.01); *G02B 30/28* (2020.01); *G02F 1/134309* (2013.01); *H04N 13/305* (2018.05); *H04N 13/359* (2018.05)

(58) Field of Classification Search
CPC ............ G02F 1/134309; H04N 13/305; H04N 13/359
(Continued)

(56) References Cited

U.S. PATENT DOCUMENTS

| 2014/0028933 A1* | 1/2014 | Chen | G02B 30/26 |
| | | | 359/465 |
| 2014/0104545 A1* | 4/2014 | Miyazawa | G02B 30/27 |
| | | | 349/96 |
| 2015/0219910 A1* | 8/2015 | Jang | H04N 13/305 |
| | | | 349/15 |

FOREIGN PATENT DOCUMENTS

| CN | 202454196 U | 9/2012 |
| CN | 104345465 A | 2/2015 |

(Continued)

OTHER PUBLICATIONS

Kuhlmann U: <Tiefenblick. Neue Techniken für brillenloses 3D>, CT Magazin Fuer Computer Technik, Heise Zeitschriften Verlag, Hannover, DE, Jan. 1, 2011. bladzijden 166-169, XP007919779, ISSN:0724-8679.

*Primary Examiner* — Charles S Chang
(74) *Attorney, Agent, or Firm* — Gang Yu

(57) ABSTRACT

The disclosure relates to a switching process for switching in an autostereoscopic display device from a first view mode to a second view mode, wherein the autostereoscopic display device comprises a display panel, a lenticular device (Continued)

and means for applying a voltage, the process comprising the application of a switching voltage across both switching electrodes of the lenticular device wherein a ramp voltage is applied that increases during a ramp period of at least 0.50 second from a starting voltage at which the lenticular device is in its, first view mode to a final voltage at which the lenticular device is in its second view mode, wherein during at least 0.40 second of the ramp period, the ramp voltage is at an intermediate voltage that is in the range of 5-60% of the minimal voltage; and the final voltage is equal to or higher than minimal voltage.

18 Claims, 5 Drawing Sheets

(51) Int. Cl.
　　　*G02F 1/1343*　　　(2006.01)
　　　*H04N 13/305*　　　(2018.01)
　　　*H04N 13/359*　　　(2018.01)
(58) Field of Classification Search
　　　USPC .......................................................... 349/13
　　　See application file for complete search history.

(56) References Cited

FOREIGN PATENT DOCUMENTS

| | | |
|---|---|---|
| CN | 106353928 A | 1/2017 |
| EP | 2453291 A2 | 5/2012 |
| GB | 2415849 A | 1/2006 |
| WO | 2009098622 A2 | 8/2009 |

\* cited by examiner

PROCESS FOR DRIVING A 2D/3D SWITCHABLE AUTOSTEREOSCOPIC DISPLAY DEVICE

CROSS REFERENCE TO RELATED APPLICATIONS

This application is a national application of PCT/CN2019/129252, filed on Dec. 29, 2019. The contents of PCT/CN2019/129252 are all hereby incorporated by reference.

TECHNICAL FIELD

The disclosure relates to a switching process for switching in an autostereoscopic display device from a first view mode to a second view mode, and to an autostereoscopic display device capable of switching from a first view mode to a second view mode.

BACKGROUND

Electrically switchable two-dimensional and three-dimensional (2D/3D) displays, commonly known as switchable autostereoscopic displays, have attracted great attention in the last two decades. In one approach, a liquid crystal display (LCD) having rows and columns of pixels is integrated with a lenticular device that comprises an array of semi-cylindrical micro-lenses (lenticulars) and a liquid crystal medium adjacent thereto. Each lenticular is then associated with a group of at least two columns of pixels that extend parallel with the lens, or under an angle thereto. The refractive index of the lenticulars is fixed, but the refractive index of the adjacent liquid crystal medium can be changed by switching between two liquid crystalline phases. In the 2D view mode, both refractive indexes match, thereby depriving the lenticulars from a focusing effect and causing the lenticular device to behave as a transparent and flat optical panel. In the 3D view mode, the liquid crystal medium is in the other liquid crystalline phase. The refractive indexes do not match anymore, which allows each lenticular to exhibit a focusing effect. This makes it possible to direct the output from different pixel columns to different spatial positions in front of the display, which on its turn allows that a stereoscopic image is perceived by a viewer. Therefore, the controlled switching between liquid crystalline phases has become crucial in the design of displays that can switch between 2D and 3D view modes.

The switching from one liquid crystalline phase to another occurs by changing the electrical field which the liquid crystalline material is subject to. This usually entails either applying an electrical field (in the case there was no such field), or switching off an electrical field (in the case it was subject to such field). It is important that the liquid crystal phase changes homogeneously upon such change in the electric field. When this is not the case, then different domains with different liquid crystal orientation may form in the liquid crystal medium. At the boundaries of these domains, there is an abrupt change in the orientation of liquid crystal molecules. Such boundary is called a "disclination". The optical properties of adjacent domains are not exactly the same, while at the disclinations optical aberrations occur. This leads to an increased crosstalk when the 3D view mode has been switched to, and to a lower image quality when the 2D view mode has been switched to.

In conventional electrically switchable 2D/3D displays, disclinations are a problem. Likely, the curvatures of the lenticular surface increase the sensitivity to the formation of disclinations. They are often found at the apexes of the lenticulars, and at the interfaces between different facets (in the event that the lenticular is a facetted lens). One of the problems is that the disclinations form upon switching from one liquid crystalline phase to the other. Another problem is the persistence of disclinations, since many disclinations stand firm on the longer term, e.g. during a plurality of switching cycles.

A lenticular device that is in particular a victim of disclinations is of the type wherein the lenticular surface with alignment properties is not formed by a coating layer of a different material (such as a polyimide), but where the lenticular elements as well as their surfaces with alignment properties consist of the same material (e.g. there are alignment grooves present in the surface of the lenticulars). This appears to increase the chances on the formation of disclinations, as well their persistence.

SUMMARY

It is therefore an objective to provide a switching process for an electrically switchable 2D/3D display wherein disclinations do not form, or at least to a lesser extent than in known switching processes. It is also an object to provide a method that lets disclinations disappear, or at least destabilize them. It is a further object to provide an electrically switchable 2D/3D display wherein disclinations do not form upon switching, or at least to a lesser extent than in known 2D/3D switchable displays.

It has now been found that one or more of these objectives can be reached by applying a particular switching method.

Accordingly, the present disclosure relates to a switching process for switching in an autostereoscopic display device from a first view mode to a second view mode, wherein the autostereoscopic display device comprises a display panel having an array of display pixel elements for producing a display output;

a lenticular device provided over the display panel that is electrically switchable to provide the first view mode or the second view mode, wherein in one of the two view modes the lenticular device comprises lenticular lens areas which direct the output from different display pixel elements to different spatial positions within a field of view of the display device so that an image intended for the left eye of a viewer and an image intended for the right eye of a viewer are displayed, allowing the viewer to perceive a stereoscopic image, the lenticular device comprising a first optically transparent substrate;

an array of lenticular elements provided over the first optically transparent substrate, wherein the lenticular elements have a lenticular surface with liquid crystal alignment properties;

a second optically transparent substrate having a flat surface with liquid crystal alignment properties, the lenticular surface with liquid crystal alignment properties and the flat surface with liquid crystal alignment properties facing each other;

a first planar switching electrode arranged at a side of the first optically transparent substrate;

a second planar switching electrode arranged at a side of the second optically transparent substrate;

a liquid crystalline composition comprising liquid crystal molecules, the composition being sandwiched between the two substrates, wherein in the first view mode, the liquid crystal molecules are lying in the plane of the switching electrodes and in the direction of the lenticular elements, and wherein in the second view mode, the liquid crystal molecules are oriented normal to the two planar switching electrodes;

means for applying a voltage at defined magnitudes across both switching electrodes to control the switching from the first view mode to the second view mode;

the process comprising the application of a switching voltage across both switching electrodes when the lenticular device is in its first view mode, the switching voltage corresponding to a voltage at which the lenticular device is in its second view mode, characterized in that:

the application of a switching voltage comprises the step of applying a ramp voltage that increases during a ramp period of at least 0.50 second from a starting voltage at which the lenticular device is in its first view mode to a final voltage at which the lenticular device is in its second view mode, wherein during at least 0.40 second of the ramp period, the ramp voltage is at an intermediate voltage that is in the range of 4.0-70% of the minimal voltage for the second view mode; and the final voltage is equal to or higher than minimal voltage for the second view mode;

wherein the minimal voltage for the second view mode is the minimal voltage that is required for the lenticular device to stay in its second view mode.

DETAILED DESCRIPTION OF THE EMBODIMENTS

Figure 1:
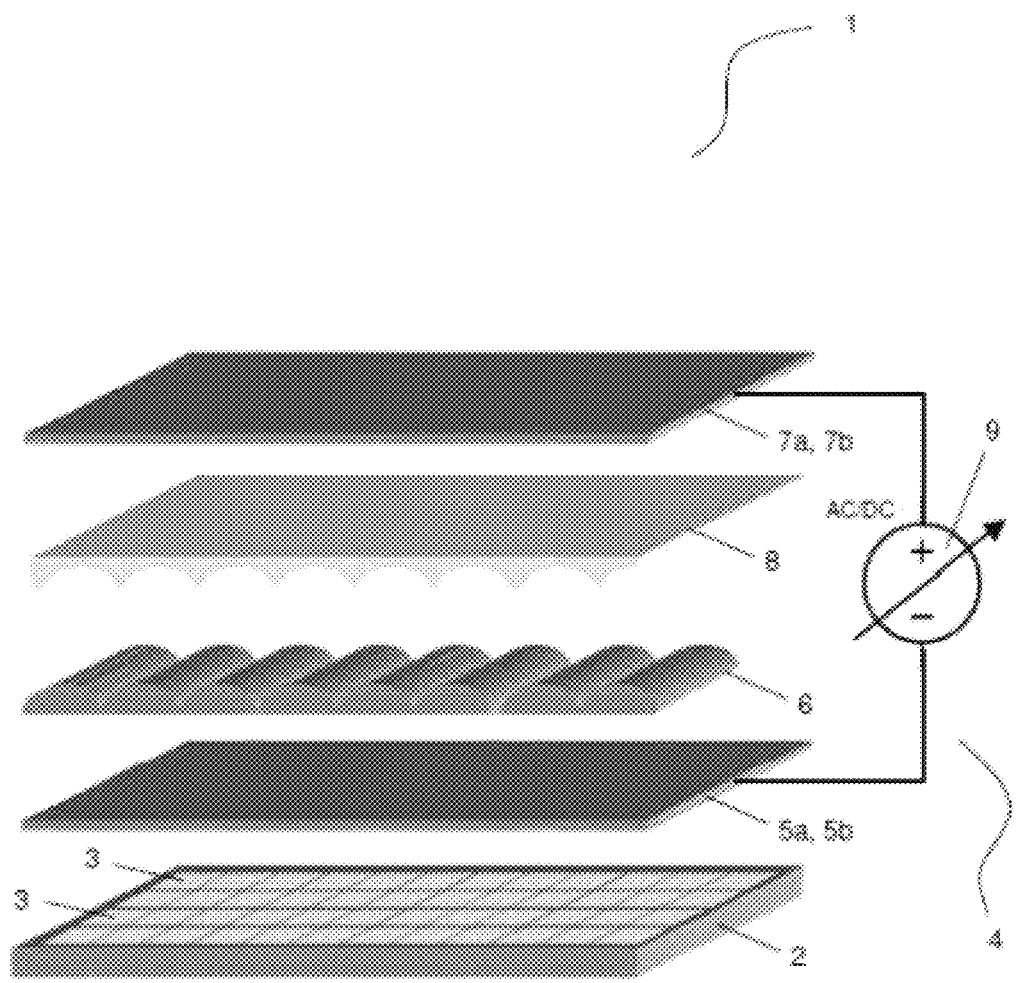
FIG. 1 displays an exploded view of an embodiment of a switchable autostereoscopic display that is used in a method according to the disclosure.

An autostereoscopic display device that is used in a method of the disclosure comprises a lenticular device that is electrically switchable to provide the first view mode or the second view mode, which are typically a mode wherein a two-dimensional image can be viewed (2D view mode) and a mode wherein a three-dimensional image can be viewed (3D view mode). The switching is performed by changing the orientation of the liquid crystal molecules that are present between the two opposing surfaces with liquid crystal alignment properties. Such change in orientation is accomplished by applying a switching voltage across the two switching electrodes, i.e. applying an electric potential across them. In the absence of such an electric potential, the liquid crystal molecules are lying in the plane of the electrodes (planar orientation) and in the direction that is induced by the two alignment layers (which is typically the same direction as that of the lenticulars in the lenticular device). This corresponds to the first view mode. When a sufficiently strong electrical potential is applied, the orientation of the liquid crystal molecules switches to the orientation normal to the two planar switching electrodes (normal orientation). This corresponds to the second view mode.

The switch from one view to the other is associated with a change in refractive index of the liquid crystalline composition. In one of view modes, its refractive indexes matches that of the lenticular elements, thereby depriving the lenticulars from a focusing effect and causing the lenticular device to behave as a transparent and flat optical panel. In the other view mode, the refractive indexes do not match anymore, which allows each lenticular to exhibit a focusing effect.

The lenticular device comprises an array of lenticular elements (i.e. semi-cylindrical micro-lenses) that is provided over the display panel having the display pixel elements. Each lenticular element is then associated with a group of at least two columns of pixel elements that extend parallel with the lenticular element, or under an angle thereto. When being in the view mode wherein the refractive indexes do not match so that the lenticular elements exhibit a focusing effect, then the light emitted by a column of pixel elements (a pixel column) that is behind a particular lenticular element travels the same trajectory through the lenticular element and egresses from the lenticular device (and thus also from the autostereoscopic display device) in the same spatial direction in front of the display. In other words, it egresses as a plane-like beam wherein the lenticular element lies in that plane. This makes it possible to direct the output from different pixel columns to different spatial positions in front of the display, which on its turn allows the display of separate images—typically a left-eye image intended for the left eye and a right-eye image intended for the right eye, allowing a viewer to perceive a stereoscopic image. This mode is then the 3D view mode.

Any one of the two liquid crystal molecule orientations may correspond to any one of the two view modes—this depends on the design of the lenticular device. When it is designed such that the refractive index of the planar orientation matches that of the lenticular elements, then the device behaves as a transparent and flat optical panel in the absence of the electrical potential and is suitable for displaying two-dimensional images (the 2D view mode). Conversely, when the refractive index of the normal orientation matches that of the lenticular elements, then the device is in the 2D view mode in the presence of the electrical potential.

When a device according to any of these designs is switched to the mode wherein there is no match between the refractive indexes, then each lenticular exhibits a focusing effect and so allows to direct the output of different pixel elements to different spatial positions in front of the display. This on its turn enables the perception of a three-dimensional image by a viewer (the 3D view mode). Usually, lenticular devices are in the 2D view mode in the absence of the electrical potential. The application of a potential (the switching voltage) then causes the switch to the 3D view mode. After switching off the electrical potential, the system will revert to the 2D view mode.

The magnitude of the applied voltage that is necessary for the liquid crystal molecules to become oriented and stay oriented normal to the two planar switching electrodes (normal orientation; second view mode) depends on the design of the lenticular device as such. For each particular lenticular device, a so-called "minimal voltage for the second view mode" exists. This voltage is the minimal voltage that is required for the lenticular device to stay in its second view mode once it has reached the second view mode, and can be determined by a determination method that comprises first bringing the device in its second view mode by applying a voltage that is sufficiently high to achieve this;

decreasing the voltage whilst following the degree of liquid crystal alignment in the device (in particular whilst following lens parameters such as crosstalk and/or focal length);

determining the voltage that marks the start of the reversion of the alignment to the alignment of the first view mode (e.g. when lens parameters such as crosstalk and/or focal length start to increase).

The determined voltage corresponds to the minimal voltage for the second view mode. The skilled person knows how to obtain the minimal voltage for the second view mode, for which he applies routine experimentation without exerting inventive skills. For most lenticular devices, the minimal voltage for the second view mode is somewhere in the range of 5-15 V. In particular, for many lenticular devices it is in the range of 7-12 V.

In a process of the disclosure, the lenticular device is initially in its first view mode. The switching to the second view mode comprises the application of a switching voltage across both electrodes. This is a voltage at which the lenticular device changes to and stays in its second view mode. When the voltage is applied, the orientation of the liquid crystal molecules switches to the orientation normal to the two planar switching electrodes (normal orientation).

It was surprisingly found that when the switching voltage was not applied (nearly) instantaneously but instead via a ramp wherein the voltage remains some time at an intermediate voltage that is below 60%, in particular in the range of 5-50%, of the minimal voltage for the second view mode, less disclinations were formed. Moreover, the disclinations that did form after the switching disappeared faster than without applying the ramp voltage.

The period of ramping the voltage in a process of the disclosure is at least 0.50 second, during at least 0.40 second of which the ramp voltage is at an intermediate voltage that is in the range of 5.0-60% of the minimal voltage for the second view mode (i.e. the ramp voltage may vary during the at least 0.40 second within that range of 5.0-60% of the minimal voltage for the second view mode).

The ramping starts at a starting voltage at which the lenticular device is in its first view mode. This voltage is usually 0.0 V, but it may also be a higher voltage (as long as the device is in the first view mode). For example, a residual voltage may be present of less than e.g. 4.0 V. Usually, such voltage is less than 3.0 V. Preferably, such voltage is less than 2.0 V. During the ramping, the ramp voltage increases to a final voltage. At this voltage, the lenticular device is in its second view mode. It is therefore at least as high as the minimal voltage for the second view mode. Usually, the final voltage is higher than that; it is e.g. in the range of 10-100 V. In particular, it is in the range of 14-80 V, more in particular it is in the range of 20-60 V. When the final voltage has been reached, in effect the switching voltage of the preamble has been applied.

After the final voltage across both switching electrodes has been reached, this voltage may be reduced to a voltage that is at least as high as the minimal voltage for the second view mode (which will only apply when the final voltage that has been reached is higher than the minimal voltage for the second view mode).

The ramp period may be at least 1.0 second, at least 1.5 seconds, at least 2.0 seconds, at least 3.0 seconds, at least 4.0 seconds, at least 5.0 seconds, at least 6.0 seconds, at least 7.0 seconds, at least 8.0 seconds, at least 9.0 seconds, at least 10 seconds, at least 12 seconds, at least 15 seconds, at least 18 seconds, at least 20 seconds, at least 25 seconds, at least 30 seconds, or at least 40 seconds. The ramp period may be 60 seconds or less. Preferably, however, the ramp period is as short as possible, since a shorter ramp period is equivalent to a shorter switching time, and viewers generally prefer short switching times. The ramp period is for example 50 seconds or less, 40 seconds or less, 30 seconds or less, 25 seconds or less, 20 seconds or less or 15 seconds or less. Typically, the ramp period is in the range of 1-20 seconds.

The duration of the period wherein the ramp voltage is at the intermediate voltage is usually at least 75% of the total ramp period. For example, with a ramp period of 4.0 seconds, the duration is then at least 3.0 seconds. It is in principle also possible to have an extended ramp period after the ramp voltage has surpassed the intermediate voltage (so that the duration at the intermediate voltage falls below the abovementioned 75%), but this does not give the advantages that are observed when the ramp voltage is at the intermediate voltage.

In the process of the disclosure, the intermediate voltage is in the range of 5.0-60% of the minimal voltage for the second view mode. In particular, it is in the range of 8.0-55%, more in particular, it is in the range of 12-50% of the minimal voltage for the second view mode. It may also be in the range of 15-40% or in the range of 20-30%.

In an embodiment of the disclosure,
the ramp period is at least 2.0 seconds; and
during at least 1.5 seconds of the ramp period, the ramp voltage is in the range of 10-50% of the minimal voltage for the second view mode.

In another embodiment of the disclosure,
the ramp period is at least 5.0 seconds; and
during at least 4.0 seconds of the ramp period, the ramp voltage is in the range of 15-45% of the minimal voltage for the second view mode.

Further, it was surprisingly found that the frequency of the intermediate voltage may have a particularly advantageous effect on the formation of disclinations and/or on the destabilization of the disclinations once formed. It appeared that when the intermediate voltage is an alternating voltage with a lower frequency (i.e. lower than that of the final voltage), such as a frequency in the range of 0.1-12 Hz, less disclinations were formed during the switching to the second view mode. In particular, the frequency is in the range of 0.5-10 Hz, more in particular it is in the range of 0.8-7.5 Hz, and even more in particular it is in the range of 1.0-5.0 Hz. The frequency of the final voltage is, independently of the frequency of the intermediate voltage, preferably at least 45 Hz, more preferably at least 50 Hz, for example in the range of 60-100 Hz.

Figure 5:
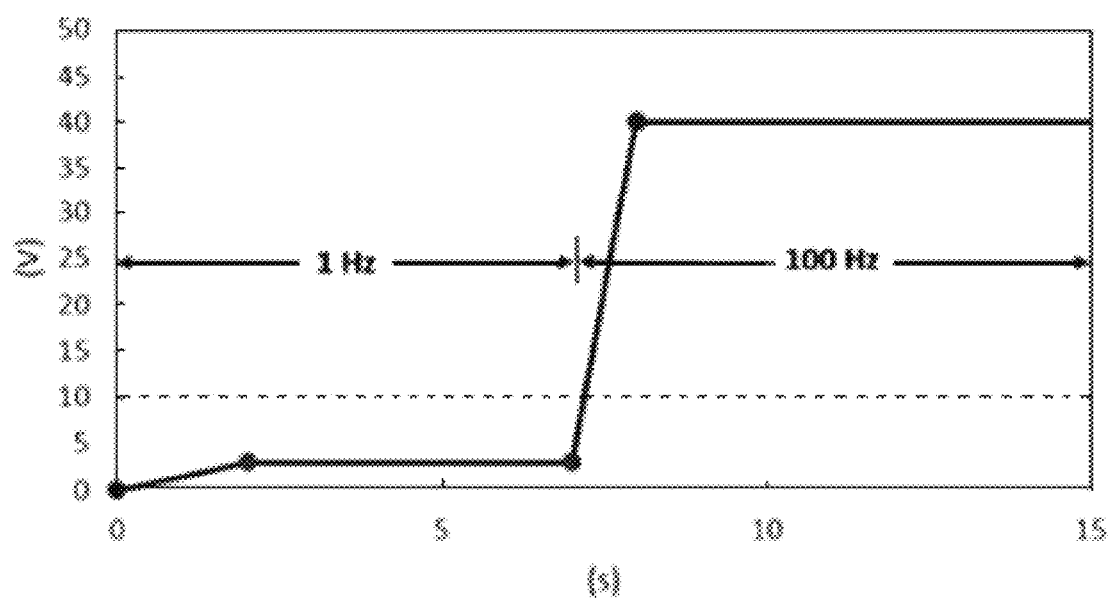
FIG. 5 displays a voltage scheme for switching a lenticular display device from the first view mode to the second view mode.

An example of a voltage scheme for the switching of a lenticular display device according to a process of the disclosure is provided in FIG. 5. The ramp voltage is at the intermediate voltage during 7 seconds, after which a fast switch to the final voltage of 40 V is made. The minimal voltage for the second view mode is indicated in FIG. 5 by a dotted line at 10 V, which is lower than the final voltage of 40 V. Further, it follows from FIG. 5 that the frequency of the intermediate voltage is kept substantially lower (1 Hz) than the frequency of the final voltage and the ramping thereto (100 Hz).

Another surprising beneficial effect on the formation of disclinations and/or on the destabilization of the disclinations appeared to occur when the final voltage is an alternating voltage with a frequency in the range of 0.1-15 Hz, in particular in the range of 0.5-10 Hz, more in particular in the range of 1.0-8.0 Hz, and even more in particular in the range of 2.0-6.0 Hz. It appeared that the longer the duration of the final voltage, the better the effect. The duration is preferably at least 2 minutes, at least 5 minutes or at least 10 minutes. Since an autostereoscopic display device being subject to such frequencies is not suitable for being viewed at because the frequencies are relatively low (which viewers will experience as an insufficient viewing comfort and/or an undesired display quality), this particular process is preferably carried out as a background process when viewers are absent.

The problem with the disclinations that is solved by the present disclosure in particular occurs with displays wherein the liquid crystal alignment properties of the lenticular elements are contained in the material of the lenticulars themselves, and not in a layer (such as a polyimide layer) that is present on top of the lenticulars. Such lenticulars have gained their liquid crystal alignment properties e.g. by an abrasive treatment of their surface (such as polishing); or by an etching, engraving or lithographic process. Accordingly, in a process of the present disclosure, the lenticular elements as well as their surfaces with liquid crystal alignment properties may consist of the same material.

The disclosure further relates to an autostereoscopic display device (1) comprising
 a display panel (2) having an array of display pixel elements (3) for producing a display output;
 a lenticular device (4) provided over the display panel (2) that is electrically switchable to provide the first view mode or the second view mode, wherein in one of the two view modes the lenticular device (4) comprises lenticular lens areas which direct the output from different display pixel elements (3) to different spatial positions within a field of view of the display device (4) so that an image intended for the left eye of a viewer and an image intended for the right eye of a viewer are displayed, allowing the viewer to perceive a stereoscopic image, the lenticular device (4) comprising
 a first optically transparent substrate (5a);
 an array of lenticular elements (6) provided over the first optically transparent substrate (5a), wherein the lenticular elements (6) have a lenticular surface with liquid crystal alignment properties;
 a second optically transparent substrate (7a) having a flat surface with liquid crystal alignment properties, the lenticular surface with liquid crystal alignment properties and the flat surface with liquid crystal alignment properties facing each other;
 a first planar switching electrode (5b) arranged at a side of the first optically transparent substrate (5a);
 a second planar switching electrode (7b) arranged at a side of the second optically transparent substrate (7a);
 a liquid crystalline composition comprising (8) liquid crystal molecules, the composition being sandwiched between the two substrates (5a, 7a), wherein in the first view mode, the liquid crystal molecules are lying in the plane of the switching electrodes (5b, 7b) and in the direction of the lenticular elements (6), and wherein in the second view mode, the liquid crystal molecules are oriented normal to the two planar switching electrodes (5b, 7b);
 means (9) for applying a voltage at defined magnitudes across both switching electrodes (5b, 7b) to control the switching from the first view mode to the second view mode; characterized in that:
 the means (9) for applying a voltage comprises a processor configured to apply a ramp voltage that increases during a ramp period of at least 0.50 second from a starting voltage at which the lenticular device (4) is in its first view mode to a final voltage at which the lenticular device (4) is in its second view mode, wherein
  during at least 0.40 second of the ramp period, the ramp voltage is at an intermediate voltage that is in the range of 4.0-70% of the minimal voltage for the second view mode; and
  the final voltage is equal to or higher than minimal voltage for the second view mode;
 wherein the minimal voltage for the second view mode is the minimal voltage that is required for the lenticular device (4) to stay in its second view mode.

In FIG. 1, an exploded view is displayed of an autostereoscopic display (1) according to the disclosure. A lenticular device (4) is provided over a display panel (2) comprising display pixel elements (3). The lenticular device (4) comprises an array of lenticular elements (6) and a liquid crystalline composition (8), which are both sandwiched between on the one hand a first planar switching electrode (5b) and an optically transparent substrate (5a); and on the other hand a second planar switching electrode (7b) and an optically transparent substrate (7a). A means (9) is electrically connected to both switching electrodes (5b, 7b), wherein the means (9) is for applying a voltage at defined magnitudes across both switching electrodes (5b, 7b).

Examples

Figure 2:
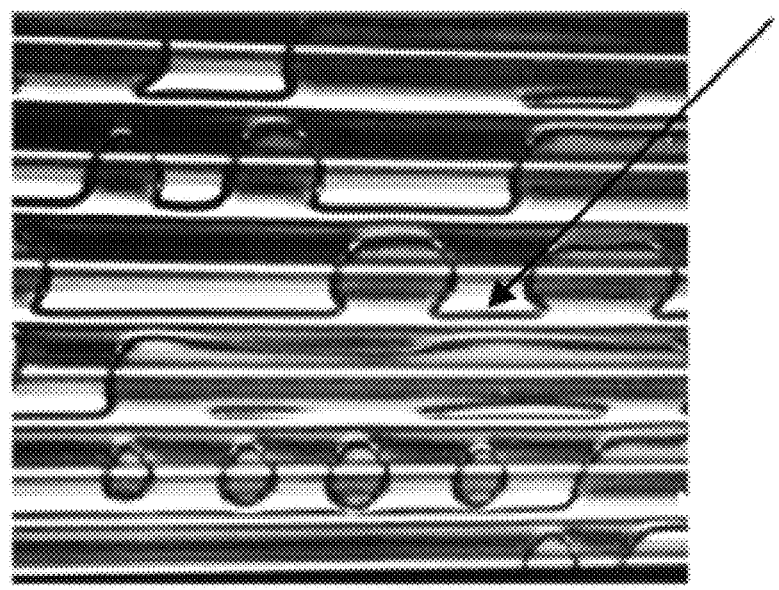
FIG. 2 displays a reflective microscope view of a lenticular display device in the 3D view mode wherein disclinations are present.

Disclinations in 2D/3D switchable cells can be observed in several ways. With the unaided eye they can be seen as lighter or darker areas, particularly well in reflection. With an optical microscope disclinations can be seen as (endless) lines within the microscope field of view, as is illustrated in the image of FIG. 2, the arrow indicating a disclination line.

Figure 3:
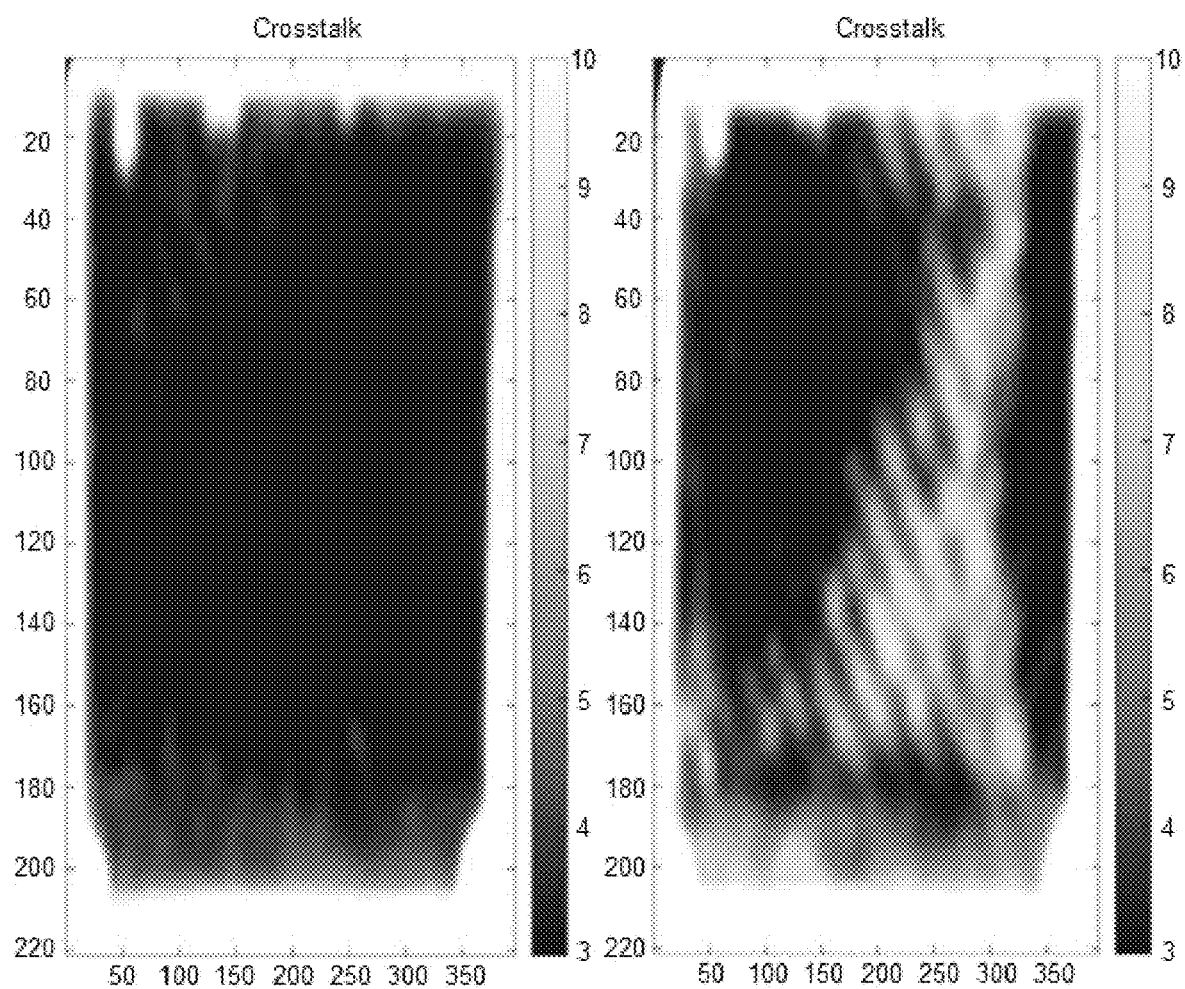
FIG. 3 displays the crosstalk percentage in two lenticular displays in the 3D view mode, one having disclinations and one being free of disclinations.

In 3D crosstalk measurements, the disclinations are identified by areas that exhibit increased crosstalk. This illustrated in FIG. 3, where the left and right image represent a lenticular display in the 3D view mode, the color scale indicating the crosstalk as a percentage. The left image has more disclinations and exhibits more crosstalk than the right image.

In the present Example, the formation and dissolution of disclinations was studied using optical microscope pictures. A Nikon Eclipse optical microscope with a Nikon digital camera was used to collect the images. The device under test was a 2D/3D switchable cell of 10.1" diagonal size and a lens pitch of 145 micrometer. The switching voltage was controlled via a PC with a custom made switching control software driving a Picoscope that relayed the signal to a custom build switch box controlling the actual voltage on the cell. In this way driving voltage schemes can be preprogrammed and executed. The minimal voltage for the second view mode was found to be 10 V.

Figure 4:
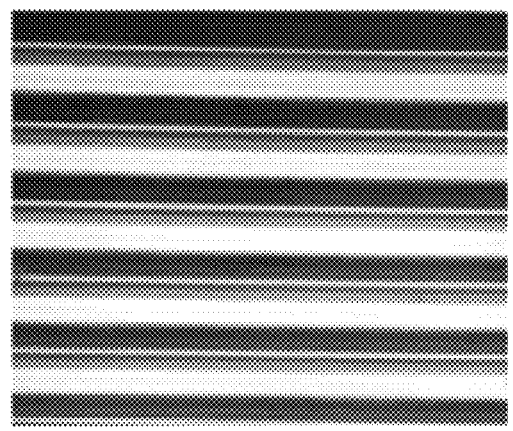
FIG. 4 displays a reflective microscope view of a lenticular display device in the 3D view mode that is free of disclinations.

The illumination of the sample was in transparent mode and the incident light was polarized parallel to the LC director at the incident interface. The incident interface was the spacer side (flat surface, no lenticular) of the 2D/3D switchable cell. The analyzer polarizer at the ocular side was directed perpendicular to the lenticular direction. The LC director at the lenticular side is parallel to the lenticulars, so the picture in the unswitched state is dark. A typical image of a lens that has been switched to the second view mode without disclinations is shown in FIG. 4.

Figure 6A:
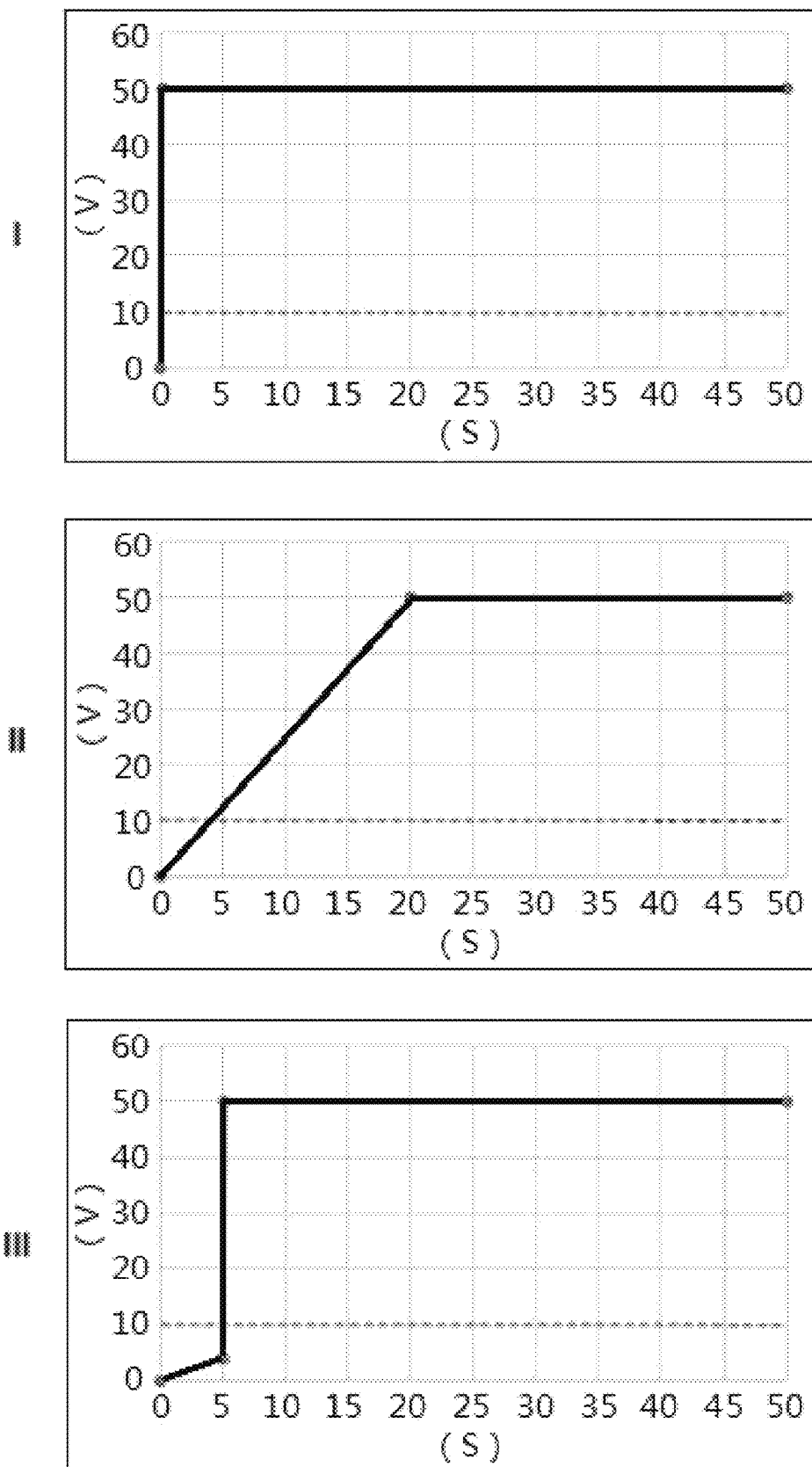
FIG. 6a displays the different voltage schemes of three different switching processes that are applied to a lenticular display device.

To illustrate the effects of the process of the disclosure, a lenticular device was subjected to three different switching processes (I, II and III). Process I is a comparative prior art process, wherein the switching voltage of 50 V is applied instantaneously (0.1 second). Processes II and III are according to the disclosure. In process II, there is a ramp voltage that linearly increases with time to reach the final voltage of 50 V after 20 s. In process III, there is a ramp wherein the voltage linearly (but slower than in process II) increases to 4 V during 5 s, which is then followed by an instantaneous increase to the final voltage of 50 V. The voltage schemes of these processes are provided in FIG. 6a. The minimal voltage for the second view mode is indicated by a dotted line at 10 V.

Figure 6B:
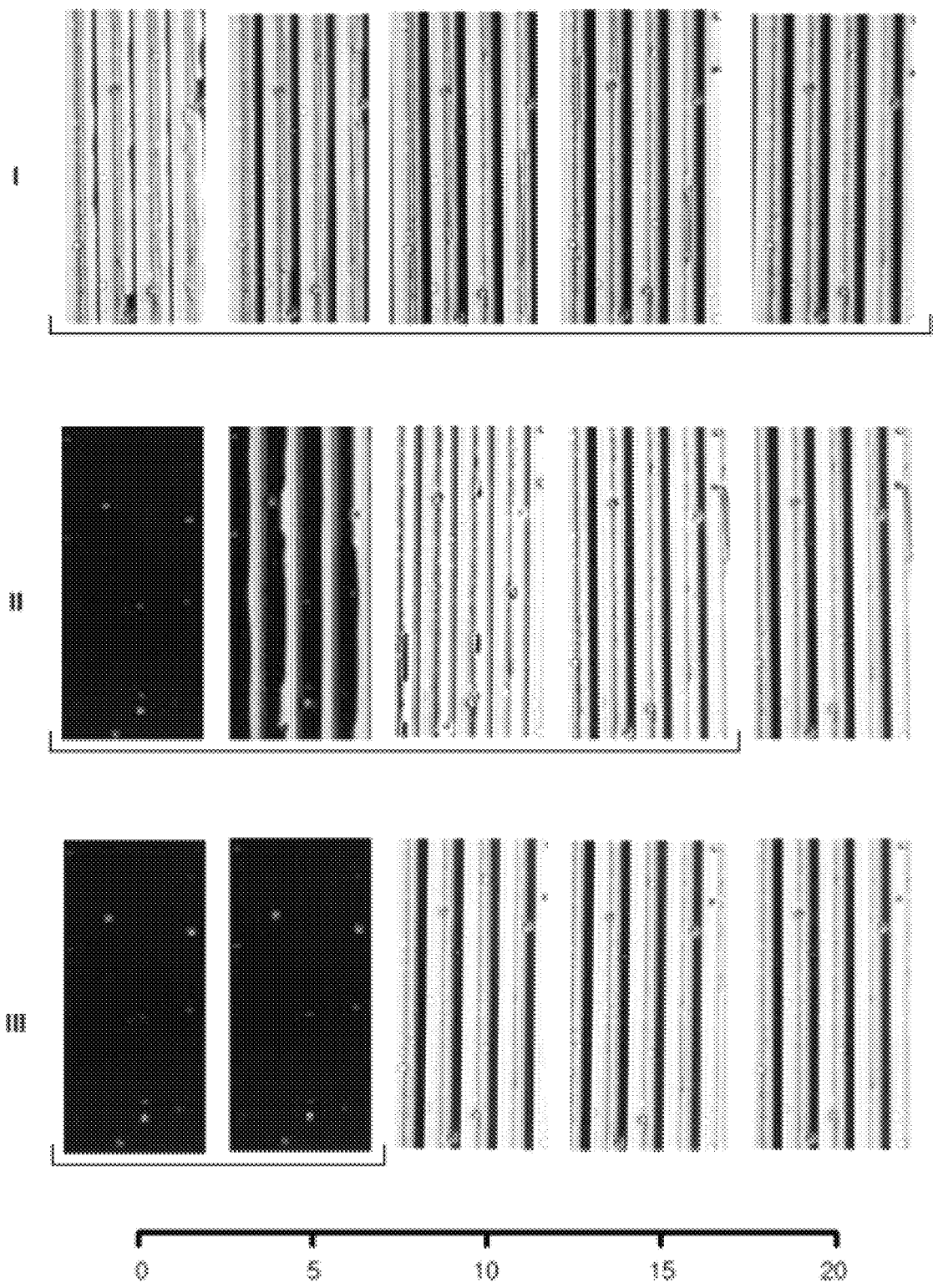
FIG. 6b displays the evolution of the disclinations on the section of a lenticular display device when subjected to three different switching processes.

FIG. 6b shows in three rows (I, II and III) the evolution of the disclinations on the section of a lenticular display device that is subjected to these three different switching processes. From left to right, the microscope pictures of the particular section are shown after 0, 5, 10, 15 and 20 seconds, respectively. After 20 s, all sections are free of disclinations (i.e. whatever the method, all disclinations have vanished after 20 s).

In row I, II and III all disclinations are dissolved after 20 s, 15 s and 5 s, respectively. Process III basically enables the transition from a first view mode to a disclination free second view mode 5 seconds.

The dots that are present in every image, usually at the same spots, are so-called spacer balls for providing an even spacing between the two optically transparent substrates.

What is claimed is:

1. Switching process for switching in an autostereoscopic display device from a first view mode to a second view mode, wherein the autostereoscopic display device comprises
    a display panel having an, array of display pixel elements for producing a display output;
    a lenticular device provided over the display panel that is electrically switchable to provide the first view mode or the second view mode, wherein in one of the two view modes the lenticular device comprises lenticular lens areas which direct the output from different display pixel elements to different spatial positions within a field of view of the display device, the lenticular device comprising
        a first optically transparent substrate;
        an array of lenticular elements provided over the first optically transparent substrate, wherein the lenticular elements have a lenticular surface with liquid crystal alignment properties;
        a second optically transparent substrate having a flat surface with liquid crystal alignment properties, the lenticular surface and the flat surface facing each other;
        a first planar switching electrode arranged at a side of the first optically transparent substrate;
        a second planar switching electrode arranged at a side of the second optically transparent substrate;
        a liquid crystalline composition comprising liquid crystal molecules, the composition being sandwiched between the two substrates, wherein in the first view mode, the liquid crystal molecules are lying in the plane of the switching electrodes and in the direction of the lenticular elements, and wherein in the second view mode, the liquid crystal molecules are oriented normal to the two planar switching electrodes;
    means for applying a voltage at defined magnitudes across both switching electrodes to control the switching from the first view mode to the second view mode;
    the process comprising the application of a switching voltage across both switching electrodes when the lenticular device is in its first view mode, the switching voltage corresponding to a voltage at which the lenticular device is in its second view mode,
wherein:
    the application of a switching voltage comprises the step of applying a ramp voltage that increases during a ramp period of at least 0.50 second from a starting voltage at which the lenticular device is in its first view mode to a final voltage at which the lenticular device is in its second view mode, wherein
    during at least 0.40 second of the ramp period, the ramp voltage is at an intermediate voltage that is in the range of 5.0-60% of the minimal voltage for the second view mode; and
    the final voltage is equal to or higher than minimal voltage for the second view mode;
    wherein the minimal voltage for the second view mode is the minimal voltage that is required for the lenticular device to stay in its second view mode;
    wherein, the ramp period is at least 2.0 seconds; and during at least 1.5 seconds of the ramp period, the ramp voltage is in the range of 10-50% of the minimal voltage for the second view mode.

2. Switching process according to claim 1, wherein the ramp period is at least 5.0 seconds; and
during at least 4.0 seconds of the ramp period, the ramp voltage is in the range of 15-45% of the minimal voltage for the second view mode.

3. Switching process according to any of claim 2, wherein the intermediate voltage is an alternating voltage with a frequency in the range of 0.1-15 Hz, in particular in the range of 1.0-10 Hz.

4. Switching process according to claim 1, wherein the ramp period is 40 seconds or less.

5. Switching process according to any of claim 4, wherein the intermediate voltage is an alternating voltage with a frequency in the range of 0.1-15 Hz, in particular in the range of 1.0-10 Hz.

6. Switching process according to claim 1, wherein the intermediate voltage is an alternating voltage with a frequency in the range of 0.1-15 Hz, in particular in the range of 1.0-10 Hz.

7. Switching process according to claim 1, wherein the final voltage is in the range of 14-80 V.

8. Switching process according to claim 1, wherein the final voltage is an alternating voltage with a frequency of 45 Hz or more, in particular 50 Hz or more.

9. Switching process according to claim 1, wherein the final voltage is an alternating voltage with a frequency in the range of 0.5-12 Hz, in particular in the range of 1.0-8.0 Hz.

10. Switching process according to claim 1, wherein the final voltage is applied during at least 10 minutes, in particular during at least 25 minutes.

11. Switching process according to claim 10, wherein the final voltage is at least three times higher than the minimal voltage for the second view mode.

12. Switching process according to claim 1, wherein the final voltage is at least three times higher than the minimal voltage for the second view mode.

13. Switching process according to claim 1, wherein, after the final voltage has been reached, the voltage across both switching electrodes is reduced to a voltage that is at least as high as the minimal voltage for the second view mode.

14. Switching process according to any of claim 1, wherein the intermediate voltage is an alternating voltage with a frequency in the range of 0.1-15 Hz, in particular in the range of 1.0-10 Hz.

15. Switching process according to any of claim 1, wherein the final voltage is in the range of 14-80 V.

16. Autostereoscopic display device capable of switching from a first view mode to a second view mode, the autostereoscopic display device comprising
- a display panel having an array of display pixel elements for producing a display output;
- a lenticular device provided over the display panel that is electrically switchable to provide the first view mode or the second view mode, wherein in one of the two view modes the lenticular device comprises lenticular lens areas which direct the output from different display pixel elements to different spatial positions within a field of view of the display device, the lenticular device comprising
  - a first optically transparent substrate;
  - an array of lenticular elements provided over the first optically transparent substrate, wherein the lenticular elements have a lenticular surface with liquid crystal alignment properties;
  - a second optically transparent substrate having a flat surface with liquid crystal alignment properties, the lenticular surface and the flat facing each other;
  - a first planar switching electrode arranged at a side of the first optically transparent substrate;
  - a second planar switching electrode arranged at a side of the second optically transparent substrate;
  - a liquid crystalline composition comprising liquid crystal molecules, the composition being sandwiched between the two substrates, wherein in the first view mode, the liquid crystal molecules are lying in the plane of the switching electrodes and in the direction of the lenticular elements, and wherein in the second view mode, the liquid crystal molecules are oriented normal to the two planar switching electrodes;
- means for applying a voltage at defined magnitudes across both switching electrodes to control the switching from the first view mode to the second view mode;

wherein:
- the means for applying a voltage comprises a processor configured to apply a ramp voltage that increases during a ramp period of at least 0.50 second from a starting voltage at which the lenticular device is in its first view mode to a final voltage at which the lenticular device is in its second view mode, wherein
  - during at least 0.40 second of the ramp period, the ramp voltage is at an intermediate voltage that is in the range of 5.0-60% of the minimal voltage for the second view mode; and
  - the final voltage is equal to or higher than minimal voltage for the second view mode;
- wherein the minimal voltage for the second view mode is the minimal voltage that is required for the lenticular device to stay in its second view mode;
- wherein, the ramp period is at least 5.0 seconds; and during at least 4.0 seconds of the ramp period, the voltage is between 15% and 45% of the minimal voltage for the second view mode.

17. Autostereoscopic display device according to claim 16, wherein the lenticular elements as well as their surfaces with liquid crystal alignment properties consist of the same material.

18. Autostereoscopic display device according to claim 16, wherein the minimal voltage for the second view mode is in the range of 5-15 V, in particular in the range of 7-12 V.

\* \* \* \* \*